B. ROUS.
NECK MAKING MACHINE.
APPLICATION FILED DEC. 4, 1911.
1,073,712.
Patented Sept. 23, 1913.
6 SHEETS—SHEET 1.
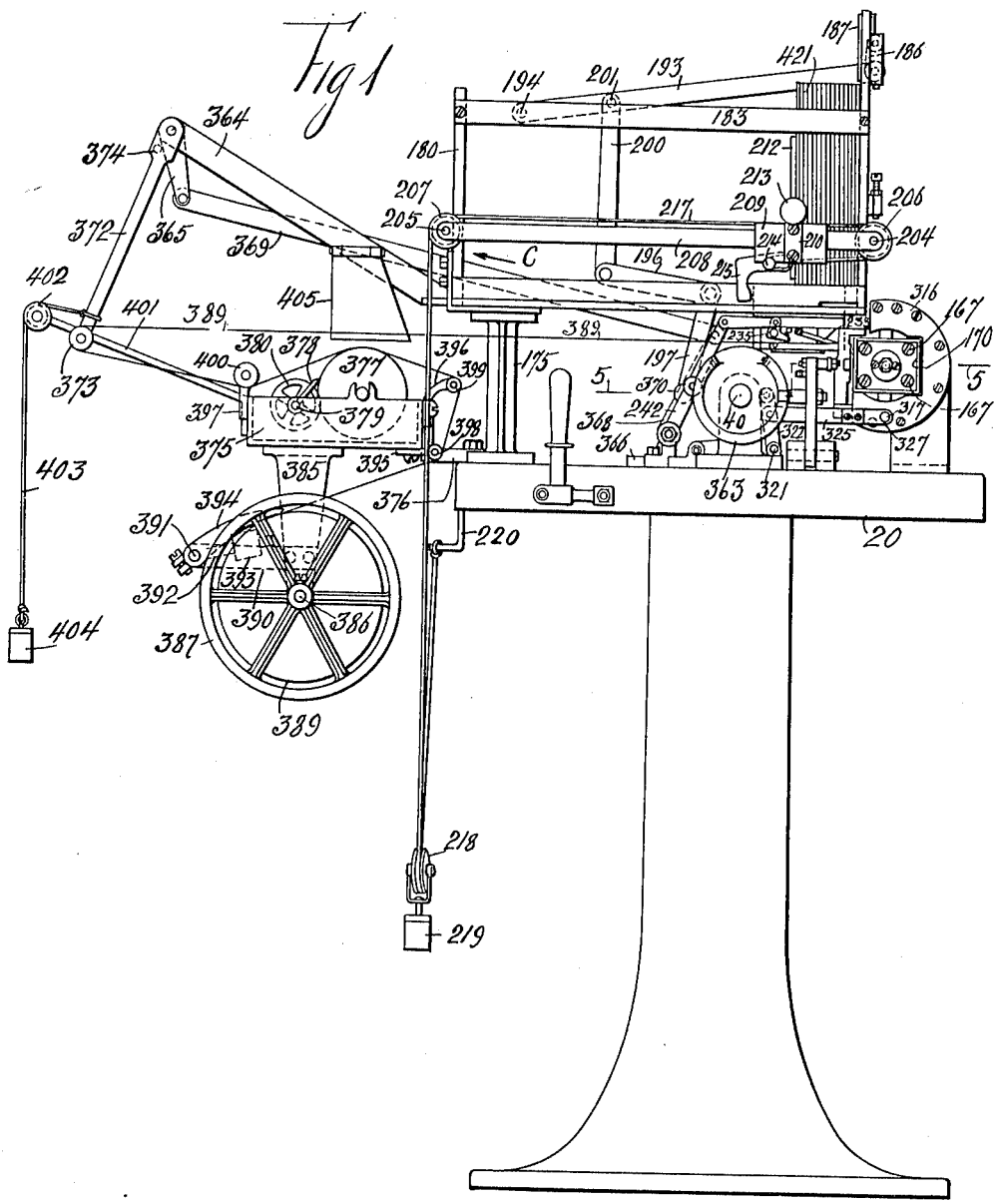

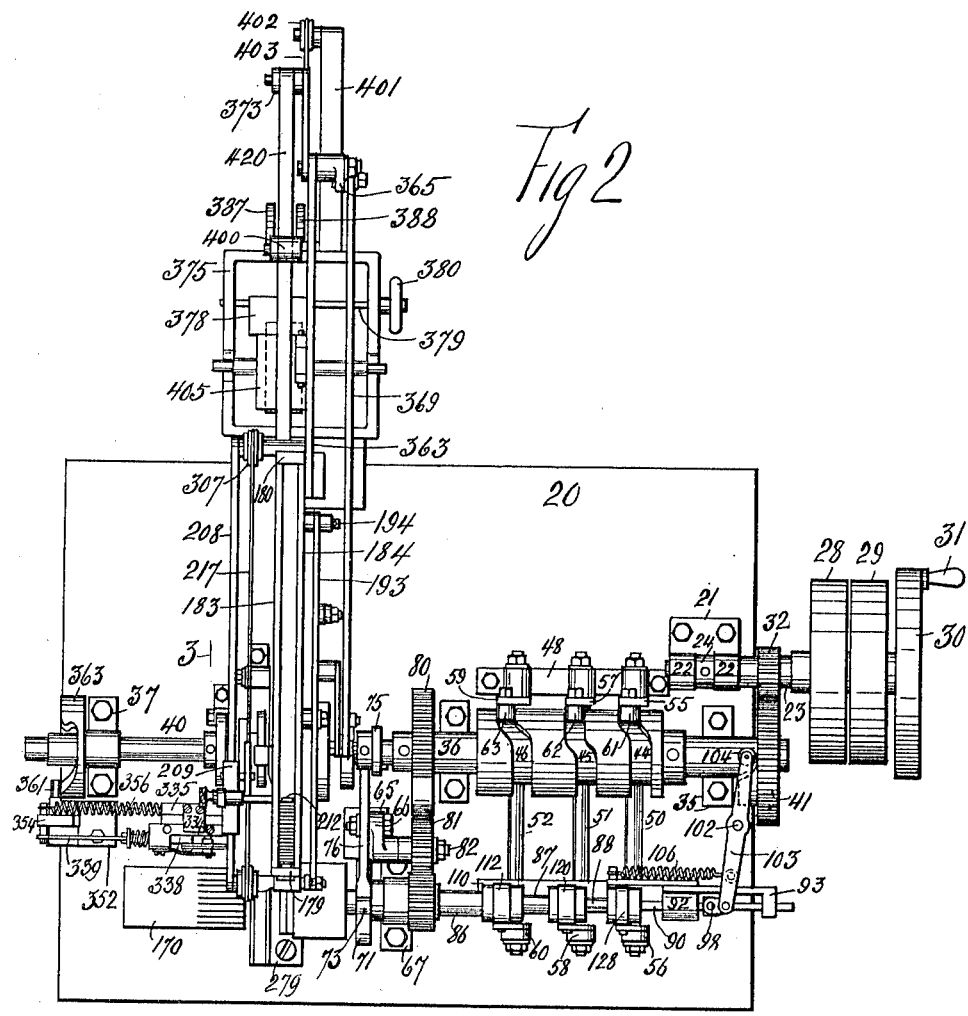

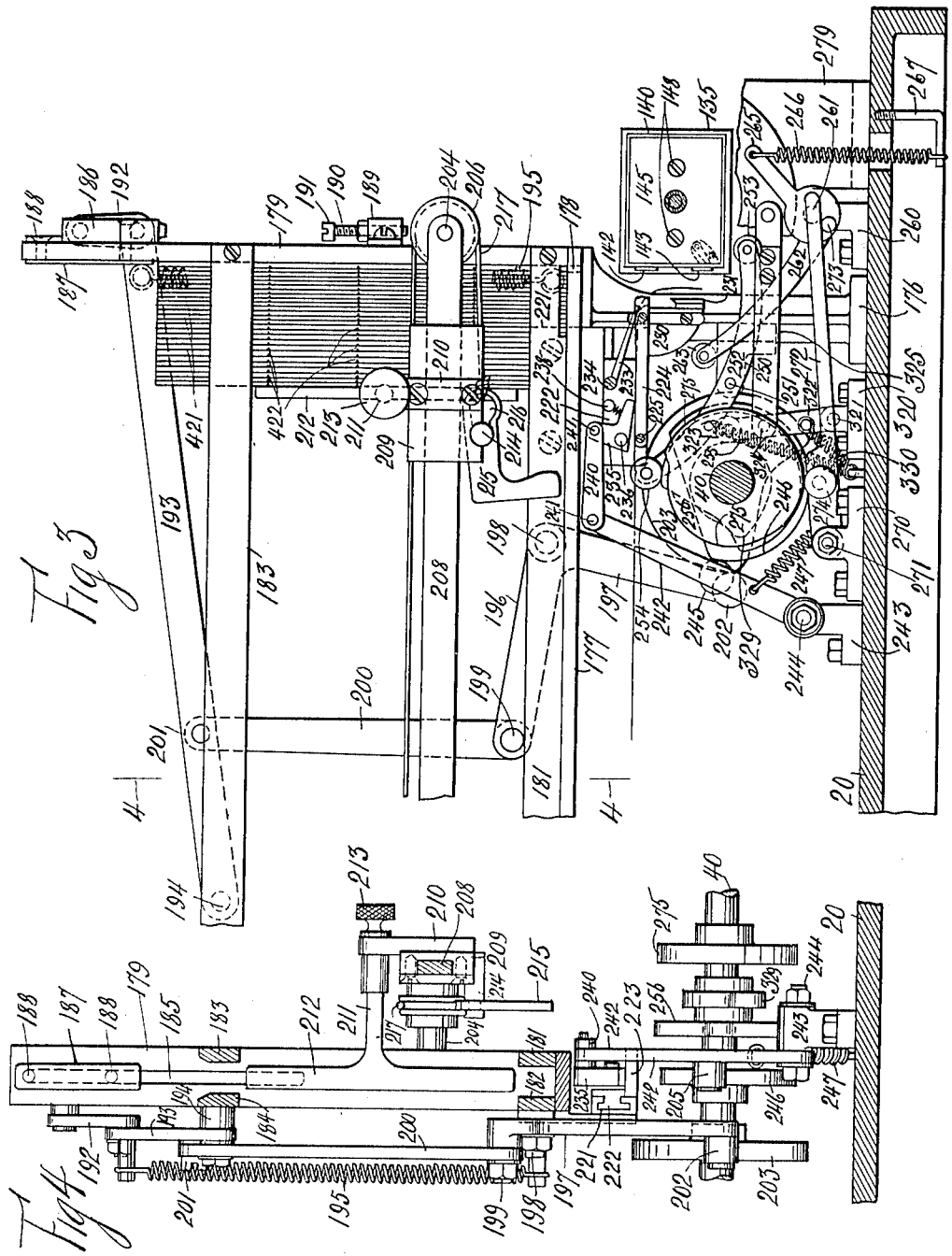

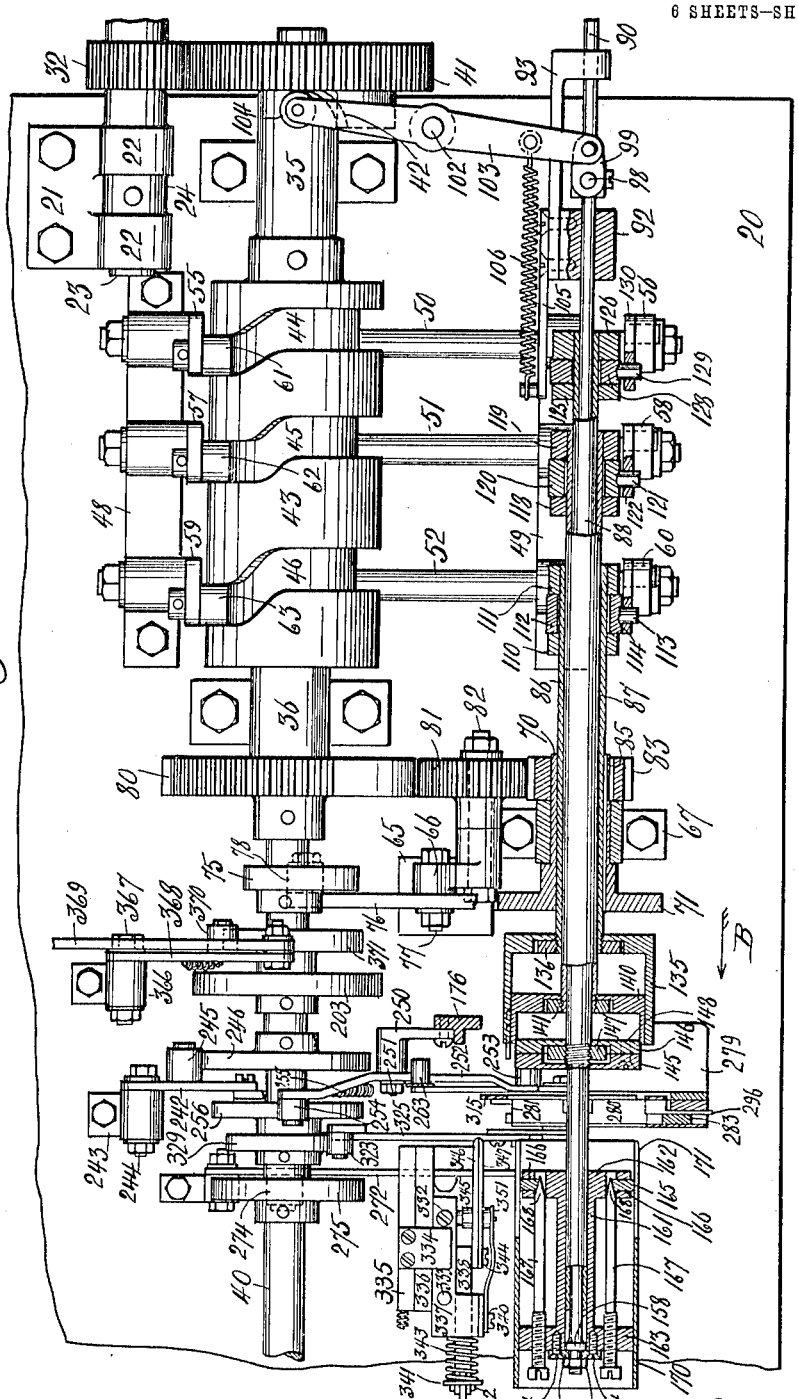

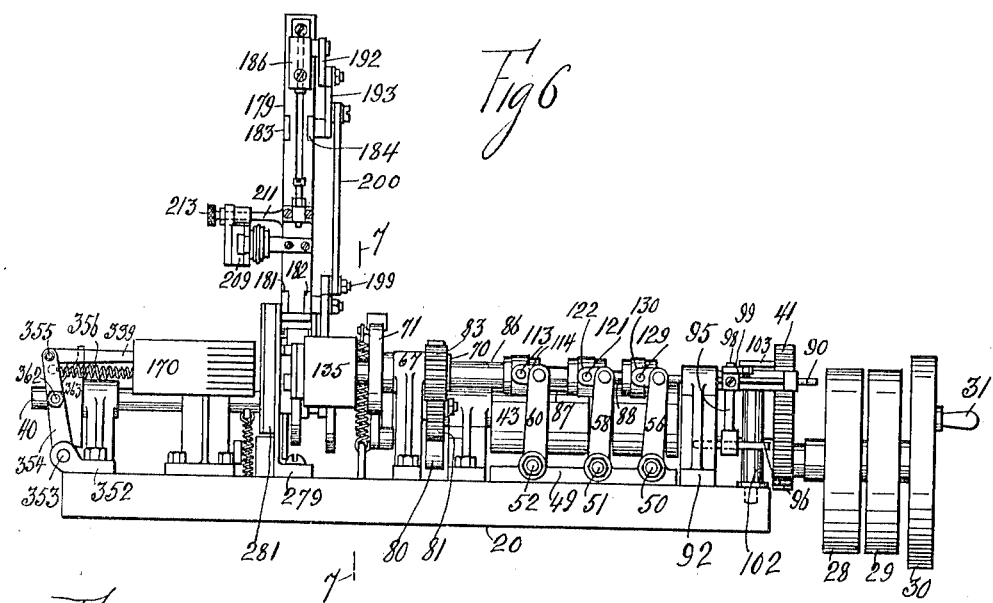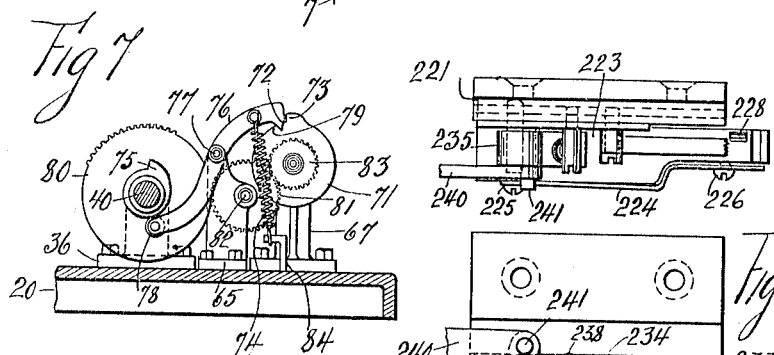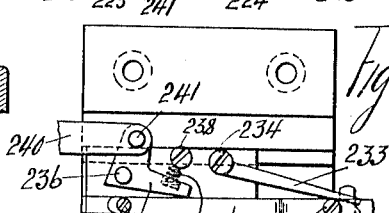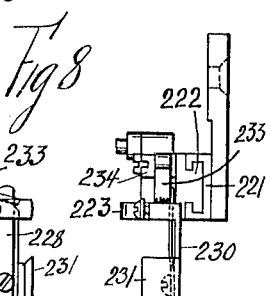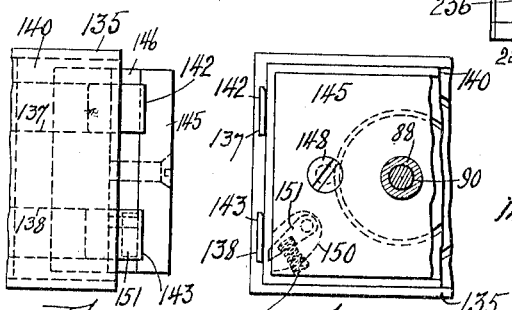

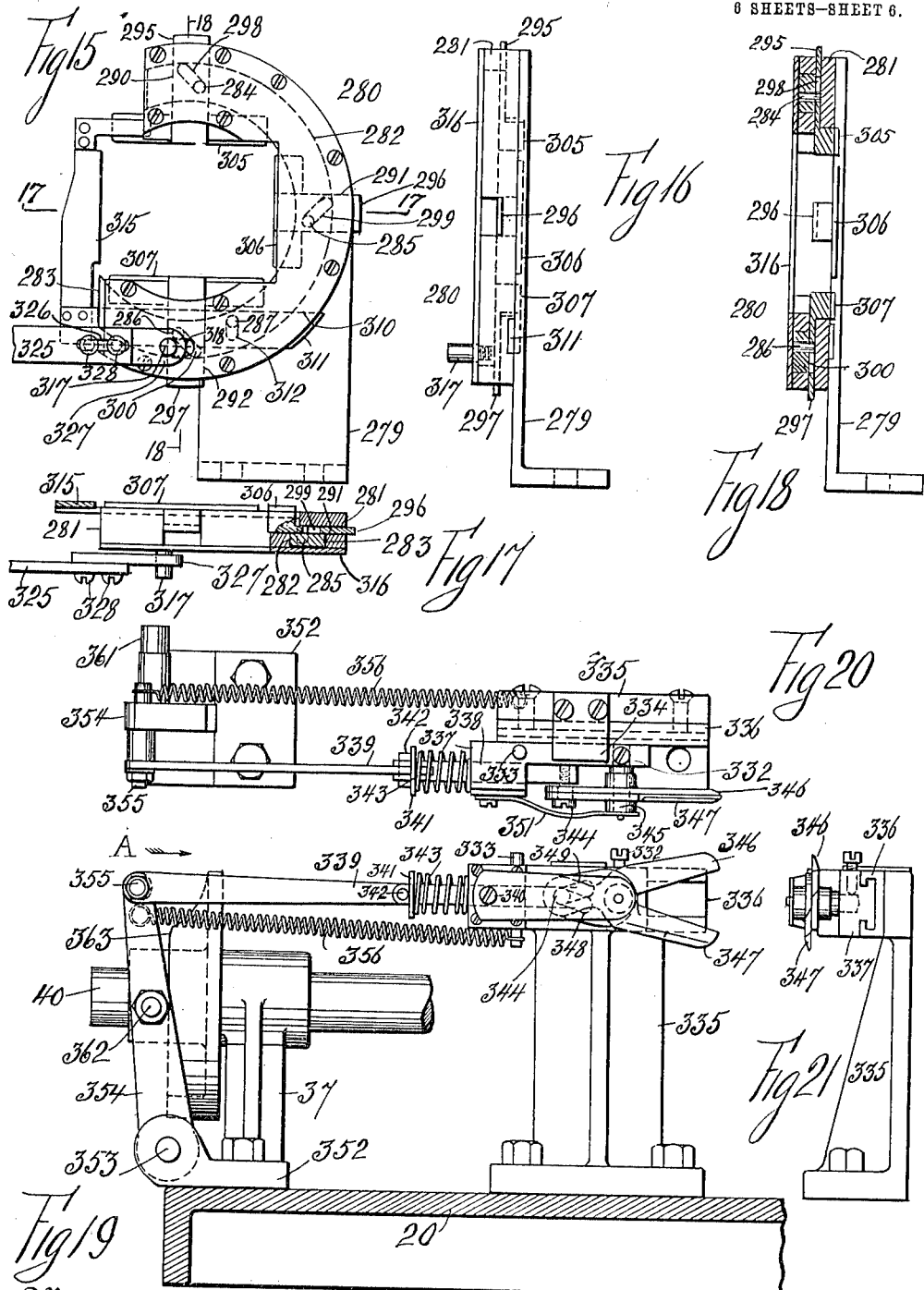

UNITED STATES PATENT OFFICE.

BERNARD ROUS, OF BROOKLYN, NEW YORK, ASSIGNOR TO LOUIS HEFTER, OF NEW YORK, N. Y.

NECK-MAKING MACHINE.

1,073,712.  Specification of Letters Patent.  Patented Sept. 23, 1913.

Application filed December 4, 1911. Serial No. 663,824.

*To all whom it may concern:*

Be it known that I, BERNARD ROUS, a citizen of the United States, and a resident of the borough of Brooklyn, in the county of Kings and State of New York, have invented certain new and useful Improvements in Neck-Making Machines, of which the following is a specification.

This invention relates to machines for making the frames or body portions of boxes, that are preferably made of a material like paste board and the like. These frames are commercially known as necks.

The invention is particularly adapted for making the necks of cigarette boxes.

The organization of the invention comprises essentially a rectangular former, for forming or bending around its periphery a strip of material like paste board which has preferably been notched at the portions that are to constitute the corners. Means are provided for rotating and reciprocating this former. Guide boxes coact with the former to maintain the strip in proper position after being bent to constitute a neck or frame. Means are also provided to fasten or glue a band to the necks and to bend it over the edges thereof.

In the accompanying drawings Figure 1 represents the front view of a machine exemplifying the invention; Fig. 2 shows a top plan view of Fig. 1; Fig. 3 is an enlarged section of Fig. 2 on the line 3, 3; Fig. 4 shows a section of Fig. 3 on the line 4, 4; Fig. 5 shows an enlarged partial plan and section of Fig. 1 on the line 5, 5; Fig. 6 represents a right hand side view of Fig. 1; Fig. 7 shows a section of Fig. 6 on the line 7, 7; Fig. 8, is an enlarged fragmentary portion of Fig. 3; Fig. 9 represents a top plan view of Fig. 8; Fig. 10 shows a right hand side view of Fig. 8; Fig. 11 is an enlarged fragmentary portion of Fig. 3; Fig. 12 is a left hand side view of Fig. 11; Fig. Fig. 13 is a fragmentary plan view of the guide boxes with a strip and paper band in position; Fig. 14 shows a section of Fig. 13 with the elements in a changed position; Fig. 15 shows a front view of the closer; Fig. 16 is a right hand view of Fig. 15; Fig. 17 is a plan view and section of Fig. 15 on the line 17, 17; Fig. 18 shows a section of Fig. 15 on the line 18, 18; Fig. 19 is a side view of the shears; Fig. 20 shows a top view of Fig. 19 and Fig. 21 is a right hand side view of Fig. 19.

The machine is shown to comprise the table 20 supporting the bracket 21 having the bearings 22, and in which latter is journaled the driving shaft 23. A collar 24 fastened to the shaft 23 is interposed between the bearings 22 to prevent the lateral displacement of said shaft. A tight pulley 28 is fastened to the shaft 23 and a loose pulley 29 is journaled thereon. A balance wheel 30 with the operating handle 31 is fastened to the shaft 23, and a pinion 32 is also fastened to said shaft.

Journal brackets 35, 36 and 37 are fastened to and extend up from the table 20, and a cam shaft 40 is journaled in the said three brackets. A spur gear 41 with the cam 42 is fastened to the shaft 40 and meshes with the pinion 32. A cam drum 43 with groove cams 44, 45 and 46 is fastened to the shaft 40. A journal bracket 48 with a plurality of bearings, and a journal bracket 49 with a plurality of bearings are supported on the table 20. Spindles 50, 51, 52 are supported in the accompanying bearings of the brackets 48 and 49. To the spindle 50 are fastened the arms 55 and 56, to the spindle 51 are fastened the arms 57 and 58, and to the spindle 52 are fastened the arms 59 and 60. The arms 55, 57 and 59 have respectively journaled at their upper ends the rollers 61, 62 and 63, which latter respectively engage the groove cams 44, 45 and 46.

On the table 20 are supported the journal bracket 65 with the lug 66 and the journal bracket 67. In the latter bracket is journaled the sleeve 70 that has formed therewith the disk 71. In the circumferential surface of the latter is formed a notch 72 and a heel 73. A cam 75 is fastened to the cam shaft 40, and a lever 76 is pivoted on a pin 77 extending from the lug 66. The lower end of the lever 76 has journaled thereto the roller 78, and at the upper end of said lever is formed the toe 79. The said roller is in the path of the cam 75 and the toe 79 is in the path of the notch 72. A spring 74 extends between the lever 76 and a hook 84 extending from the table 20. A sector 80 is fastened to the shaft 40 and can mesh with a gear 81, journaled on the pivot 82 of the bracket 65. A gear 83 is slidably connected to the sleeve 70 by means of the feather 85 and meshes with the gear 81. A tubular sleeve 86 is slidably supported in the sleeve 70. An intermediate sleeve 87 is slidably supported in the sleeve 86 and a third sleeve 88 is slidably supported in the sleeve 87. A rod 90 is slidably supported in the sleeve 88. A bracket 92 extends up from the table 20 and has an opening for the rod 90, and a secondary bracket 93 extends from the bracket 92 to support one end of the rod 90. An arm 95 extends from the rod 90 and the lower end thereof engages a pin 96, extending from the bracket 92 to prevent any rotation of the rod 90. A pin 98 is supported in the upper end of the arm 95, and on which is pivoted a link 99. A post 102 on the table 20 has pivoted thereto the lever 103, one end of which is pinned to the link 99, and the other end has a roller 104 journaled thereto, which latter is in the path of the cam 42. An arm 105 extends from the bracket 92 which carries one end of a spring 106, and the other end of the latter is fastened to the lever 103.

On the sleeve 86 are fastened two collars 110, 111, and between them is journaled the collar 112 having extending therefrom the pin 113. A link 114 has one end supported on the pin 113 and its other end is pinned to the arm 60. On the intermediate sleeve 87 are fastened two collars 118, 119 and between the latter is journaled the collar 120 having extending therefrom the pin 121. A link 122 has one end supported on the pin 121 and its other end is pinned to the arm 58. On the third sleeve 88 are fastened two collars 125, 126 and between the latter is journaled the collar 128, having extending therefrom the pin 129. A link 130 has one end supported on the pin 129 and its other end is pinned to the arm 56.

The sleeve 86 carries in threaded engagement the outer guide box 135, a jam nut 136 locking the said box in place. A pair of recesses 137, 138 are formed in one of the walls of said box. A second and inner guide box 140 is slidably located within the box 135, and is also in threaded engagement with the sleeve 87, a jam nut 141 on the sleeve 87 locking the latter box thereto. A pair of fingers 142, 143 extend from one of the walls of the box 140 and engage respectively the recesses 137 and 138. The sleeve 88 carries in threaded engagement the blocks 145 and 146. Screws 148 connect the two blocks 145, 146. In a recess 150 formed in the block 146 is pivoted a catch 151, a spring 152 bearing against said catch. The blocks 145 and 146 collectively constitute a rectangular former.

On the rod 90 is formed a collar 158 which supports a disk 159, held in place by the nut 160. A sleeve 161 with the square ends 162 and 163 encircles the third sleeve 88. Screws 164 clamp the end 163 with the disk 159. Spreading strips 165 engage grooves 166 in the square end 162, and are adjusted by means of the screws 167 having the tapered ends 168, and that are in threaded engagement with the square end 163. A finishing plunger 170 with slotted ends 171 is supported on the square end 163 and the said slotted ends 171, are adjusted by means of the spreading strips 165.

Brackets 175, 176 extend from the table 20 and carry the frame plate 177 having the opening 178. The plate 177 carries the uprights 179 and 180 which are connected by the upper tie braces 183, 184 and the lower tie braces 181, 182. The upright 179 has formed therein the slot 185 for the pusher block 186. A pusher plate 187 is carried on the block 186 by means of the screws 188 that extend through the slot 185. On the upright 179 is fastened a threaded bracket 189 with the adjusting screw 190 having the head 191. The screw constitutes an adjustable stop for the pusher block 186.

A link 192 has one end pinned to the pusher block 186 and its other end is pinned to one end of the lever 193, which in turn is pinned to the tie brace 184 by means of the pin 194. A spring 195 extends between the lever 193 and the tie brace 182. A bell crank with the arms 196 and 197 is pivoted, by means of the pin 198, to the tie brace 182. The arm 196 carries a pin 199 on which is pinned one end of the link 200, which latter by means of the pin 201 is connected to the lever 193. The arm 197 has journaled thereto the roller 202. A cam 203 fastened to the shaft 40 is in the path of the roller 202. A pin 204 extends from the upright 179 and a pin 205 extends from the upright 180, which respectively support the pulleys 206 and 207. A guide bar 208 is also supported on the pins 204, 205. A sliding carriage 209 is supported on the guide bar 208, and carries the bracket 210 which has an opening for the spindle 211 of the pressure plate 212. A knurled head 213 is carried on the spindle 211. A pin 214 extends from the carriage 209 and supports a handle 215 by means of the slot 216 in the latter. A band 217 extends from the handle 215 passes over the pulley 206, then over the pulley 207, next under the suspended pulley 218. It carries the weight 219, and finally is fastened to the hook 220 extending from the lower face of the table 20.

From the brace 182 is suspended a guide bracket 221 which slidably supports the carriage 222, that has formed therewith a table 223. A guide spring 224 has one end fastened to the carriage 222 by means of the screw 225, and an adjusting screw 226 supported in the carriage extends through an opening in the other end of the spring 224.

A lug 230 extends from the table 223 and has extending therefrom a rubber buffer 231. A spring 228 extends from the lug 230 through the opening in the carriage 222. A bending arm 233 is pivoted on a pin 234 extending from the carriage 222. A pawl 235 is pivoted on a pin 236, extending from the carriage 222 and a spring 237 bears between the pawl and a screw pin 238 extending from the carriage 222. To the upper end of the pawl 235 is pinned one end of a link 240 by means of the pin 241. The other end of the latter link is pinned to the lever 242. A bracket 243 on the table 20 carries a pin 244 for the lever 242, and the latter has journaled thereon the roller 245. A cam 246 on the shaft 40 is in the path of the roller 245. A spring 247 extends between the lever 242 and the table 20. To the bracket 176 is fastened the bracket 250 with the pin 251, on which latter is pivoted the lever 252. In the ends of said lever are journaled the rollers 253 and 254. The roller 253 is the path of the blocks 145 and 146. A spring 255 extends between the lever 252 and the table 20. A cam 256 is fastened to the shaft 40 and is in the path of the roller 254.

A bracket 260 on the table 20 has extending therefrom the pin 261 on which is supported an arm 262 that carries a roller 263, which is in the path of the blocks 145, 146. An arm 265 fastened to the pin 261 carries one end of the spring 266. The latter spring extends through an opening in the table 20 and its lower end is fastened to a hook 267 extending from the lower face of the said table. A bracket 270 carried on the table 20 has a pin 271, on which is pivoted a lever 272, that bears on a pin 273 carried on the arm 265. A roller 274 is journaled on the lever 272. A cam 275 on the shaft 40 is in the path of the roller 274. A bracket 279 extends up from the table 20 and supports the closer designated generally by the numeral 280. The said closer consists of the annular plate 281 with the annular groove 282, in which latter is located a ring carrier 283, that has extending therefrom the guide pins 284, 285, 286 and 287. Radial guide slots 290, 291 and 292 are formed in the plate 281 and support respectively the slidable crossheads 295, 296 and 297. A slot 298 in the crosshead 295 engages the pin 284, a slot 299 in the crosshead 296 engages the pin 285 and a slot 300 in the crosshead 297 engages the pin 286. The cross heads 295, 296 and 297 carry respectively the closer bars 305, 306 and 307. A slot 310 is formed in the annular plate 281 for a fourth crosshead 311, and a slot 312 in the latter crosshead engages with the pin 287. A closer bar 315 is fastened to the crosshead 311. A cover plate 316 is fastened to the annular plate 281, and covers the ring carrier 283.

A pin 317 extends from the ring carrier and passes through a slot 318 in the cover plate 316. The vertical leg of the bracket 279 fastened to the annular plate 281 maintains the crosshead 311 in proper position.

From the table 20 extends a bracket 320 with the pin 321. A lever 322 is pivoted on the pin 321 and carries in its upper end the roller 323. A pin 324 is supported on the lever 322 and carries one end of the adjustable link 325 having the slot 326. To the outer end of the link 325 is adjustably connected the arm 327 by means of the screw pins 328. The outer end of the latter arm engages the pin 317 of the ring carrier 283. A cam 329 fastened to the cam shaft 40 is in the path of the roller 323. A spring 330 extends between the arm 322 and the table 20 of the machine. A bracket 335 with a stop 334 is supported on the table 20 and from which extends a guide block 336 for a carriage 337, having extending therefrom the stop pins 332 and 333. A cross head 338 is slidably supported in the carriage 337. A link 339 is pinned to the crosshead 338 by means of the pin 340. A washer 341 surrounds the crosshead 338 bearing against the pin 342 extending from the link 339. A spring 343 bears between the washer 341 and the carriage 337. From the crosshead 338 extends a screw pin 344 and a pin 345 extends from the carriage 337, the latter supports the blades 346, 347 that constitute shears. Slots 348, 349 are respectively formed with blades 346, 347 and engage the screw pin 344. A spring 351 fastened to the carriage 337 encircles the pin 345 and bears on the outer blade 347 of the shears.

A bracket 352 on the table 20 supports a pin 353 on which is pivoted an arm 354, the latter in turn by means of the pin 355 is pivoted to the link 339. A spring 356 extends between the arm 354 and the bracket 335. A roller 361 journaled on a pin 362 extends from the arm 354, and a cam 363 on the shaft 40 is in the path of the roller 361. A bracket 364 extends from the upper face of the bracket 175 and has pinned to its outer end an arm 365. A bracket 366 on the table 20 has pivoted thereto the lever 368 which in turn is pinned to one end of the link 369, the other end of the latter being pinned to the link 365. A roller 370 is journaled on the lever 368. A cam 371 is fastened to the shaft 40 in the path of the roller 370. To the arm 364 is also pinned the second arm 372 in the lower end of which latter is journaled the roller 373. A pin 374 is fastened to the link 372 and is in the path of the link 365. A glue box 375 is fastened by means of a bracket 376 to the table 20. It has journaled therein the glue wheel 377 and the spindle 379. The latter has extending therefrom a cleaning blade 378 and the hand wheel 380. A bracket 385 extends from the glue box 375 and supports a pin 386. On the pin 386 are supported a pair of wheels 387, between which is located a reel of a paper band 389. A leg 390 extends from the bracket 385 and carries a pin 391. An arm 392 with the counter weight 393 is fastened to the pin 391. A presser finger 394 is also fastened to said pin 391 and bears on the reel of paper 389. Brackets 395, 396 and 397 extend from the glue box 375 and have journaled therein respectively the rollers 398, 399 and 400. An arm 401 extends from the glue box 375 and carries at its outer end a sheave 402. A band 403 with one end fastened to the link 372 passes over the sheave 402 and supports the weight 404. A supporting plate 405 is hinged to the arm 363 and is directly above the glue wheel 377.

To operate the machine the paper band 389 is led from its reel over the rollers 398, 399 and glue wheel 377, which latter spreads a film of glue thereon. The paper band then leads under the roller 400, and over the roller 373. It then passes over the table 223, and is prevented from slipping backwardly by the pawl 235. The band 389 next moves downwardly in front of the rubber buffer 231 by the action of the bending arm 233. A plurality of paste board strips 421 preferably notched at 422 to enable them to be shaped to form the necks or frames to be formed, are located between the tie braces 181, 182 and 183, 184. The pusher plate 212 bearing against said strips by virtue of the resulting effect of the weight 219 on the sliding carriage 209, maintaining them with the requisite frictional engagement between said plate and the upright 179. The shaft 23 is rotated by means of a belt not shown engaging the pulley 28. The pinion 32 and gear 41 transmit rotation to the cam shaft 40. The cam drum 43 rotates with the shaft 40 and thereby the rollers 61, 62, 63 impart an oscillating motion to the pairs of arms 55—56, 57—58, and 59—60. The said arms respectively reciprocate the sleeves 88, 87, 86. The cam 42 of the spur gear 41 moves the roller 104 and thereby oscillates the lever 103, which latter through the link 99 reciprocates the rod 90 and thereby the plunger 170 is reciprocated. The sleeves 86, 87 and 88 are simultaneously reciprocated by virtue of the engagements of the rollers 63, 62 and 61 with their respective groove cams in the cam drum 43. After the said sleeves have respectively completed a forward and return stroke, they are turned one revolution by the action of the sector 80 on the gear 81, the latter transmitting rotation to the pinion 83. The lever 76 maintains the sleeves in proper position after each revolution, by virtue of the toe 79 locking with notch 72. The cam 75 controls the engagement of the toe 79 with the notch 72. When the guide boxes 135, 140 and the blocks 145, 146 are at rest and in the positions shown particularly in Fig. 3; the strips 421 are pushed down consecutively one after the other through the opening 178 by the pusher plate 187, the strip adjacent to the upright 179 being the one that is acted upon. The moving strip is thereby located alongside a pair of accompanying ends of the guide blocks 145, 146 and is guided in place by the fingers 142, 143. The strips travel to the lower end of the said sides of the said blocks and are pinched by the catch 151.

The distance that the strips are pushed down is controlled by the location of the adjusting screw 190, the latter controlling the stroke of the pusher block 186. The said pusher block is controlled by the action of the cam 203 on the bell crank with the arms 196 and 197 and the interposed linked connections. The spring 195 always tends to pull down the lever 193 that controls the movement of the pusher plate 187. After each strip has been lowered in position, the pusher plate 187 rises, and the rubber buffer 231 pushes the glued paper band 389 against the strip. This result is attained by the action of the cam 246 on the roller 245 journaled on the lever 242. Thereby the pawl 235 forces the paper band against the table 223, moving the carriage 222, by reason of which the buffer 231 bears against the said paper band and forces it against the strip that is located in its path and the glue fastens them together. When the buffer 231 holds the paper band against its strip, the roller 263 bears against the paper and remains then during a complete revolution of the guide boxes and blocks, to maintain the glued paper band against the strips. As soon as the roller 263 bears against the band the carriage 222 recedes from the blocks 145, 146 and the guide boxes 135, 140 said boxes and blocks turning. When they have made a quarter of a revolution the roller 253 comes in contact with the band that has just been glued to one of the strips. Before the guide boxes 135, 140 and blocks 145, 146 have made a complete revolution the paper band is cut by means of the blades 346, 347 of the shears. The shears are operated by the cam 363 engaging the roller 361 against the tension of the spring 356. The cam 363 moves the link 339 in the direction of the arrow A shown in Fig. 19 by reason of which the carriage 337 moves in the same direction as also the blades of the shears. When the stop pin 333 strikes the stop 334, the carriage is stopped and the screw pin 344 engaging the slots 348 and 349 causes the shears to close. By the movement of the arm 354 in an opposite direction, the screw pin 344 causes the blades 346 and 347 to open, and the carriage moves to its former position. The pin 332 in case the blades should not open by the spring 343 will strike the stop 334 and open the said blades. After the band has been severed the bending arm 233 bends it by gravity in the path of the buffer 231.

When the guide boxes with their blocks have made one revolution they come to a stop by reason of the function of the sector 80 and the lever 76 which maintains the disk 71 in place. Both the rollers 253 and 254 after one complete revolution of the boxes recede therefrom and the boxes and blocks or former simultaneously move outward in the direction of arrow B Fig. 5 without altering their relative positions, until the paper band 389 comes in the path of the closer bars 305, 306, 307 and 315. The closer 280 now begins its operations by the action of the cam 329 on the roller 323, which moves the adjustable link 325. The pin 317 thereby moves the ring carrier 283. The pins 284, 285, 286 and 287 close the closer plates 305, 306, 307 and 315, which bends the paper band over the edge frames or neck that has been made from the strip. Next the guide box 135 moves toward the closer 280 in the direction of the arrow B and the blocks 145 and 146 in the meantime remain stationary. Next the closer partially opens to allow the plunger 170 to enter the frame or neck and thereby bends and pushes the paper band therein, at the same time the blocks 145, 146 recede from the frame or neck and move into the second guide box 140 as shown in Fig. 14. The finishing plunger 170 follows the blocks 145, 146. Then the closer totally opens and the finishing plunger 170 moves within the neck and forces the glued paper against the inner face of the same, the outer box 135 prevents the frame or neck from spreading. Then the outer box 135 withdraws from the frame or neck and the latter remains on the slotted end 171 of the finishing plunger. Next the outer guide box 135, the second guide box 140 and the blocks 145, 146 move back to their relative original positions. While the paper band 389 is clamped by the pawl 235, the lever 368 by the action of the cam 371 causes the link 369 to move in the direction of the arrow C, Fig. 1 and the arm 365 engaging the pin 374 causes the arm 372 with its roller 373 to move in the same direction. Thereby the paper band 389 is pulled from its reel. The arm 365 next recedes from the pin 374 and the band is maintained in its position by the weight 404. This function is provided so that when the band is again pulled by the action of the pawl 235 with its carriage 222, the paper is not then paid out from its reel by the elevation of the weight 404. This is necessary by reason of the jerky motion given the band by the rectangular form of the boxes and blocks.

Having described my invention what I desire to secure by Letters Patent and claim is:

1. In a neck making machine the combination of a former for a strip of material, means to turn said former, means to reciprocate the former, an inner box around the former, an outer guide box around the inner box, means extending from the inner box to guide the strip, means on the said former to clamp the strip in place and means to fasten a paper band to the strip as the latter is turning and being converted into a frame or neck.

2. In a neck making machine the combination of a former, means to turn said former, means to lock said former in operative position after each revolution thereof, means to locate a strip of material against one of the sides of said former while it is at rest, a buffer in the machine opposite the strip of material, means to move the buffer to fasten or glue a band against said strip, and an element pressing the band against said strip during the turning of said former.

3. In a neck making machine the combination of a reciprocating carriage, means in the machine to support a reel of paper band, a glue box in the machine, a glue wheel in said box for said band, a bracket in the machine, an arm pinned to said bracket, means to move said arm, a second arm pinned to the bracket, a roller journaled in the end of the second arm engaging said band, a pin on the second arm in the path of the first arm, a band fastened to the end of the second arm, a weight supported by the band and a roller for the latter band.

4. In a neck making machine the combination of a sleeve journaled in the machine, means to intermittently rotate said sleeve, a tubular sleeve slidably connected to said sleeve, means to reciprocate said tubular sleeve, an intermediate sleeve slidably located within the tubular sleeve, means to reciprocate the intermediate sleeve, a third sleeve slidably located within the intermediate sleeve, means to reciprocate the third sleeve, a rod slidably supported in the third sleeve, means to reciprocate said rod, an outer guide box connected to one end of the tubular sleeve, a second inner guide box within the outer guide box and connected to the intermediate sleeve, a former within the inner guide box and secured to the third sleeve and a finishing plunger carried on the said rod.

5. In a neck making machine the combination of a former for a strip of material, means to turn the said former, means to reciprocate the former, an inner box around the former, an outer guide box around the inner box, a finger extending from the inner box to guide the strip, means on the said former to clamp the strip in place, means to fasten a paper band to the strip as the latter is turning and being converted into a frame or neck, means to cut the said band, a closer coacting with the said former to bend the said band over the outer surface of the neck, a finishing plunger coacting with the outer guide box and means to force the plunger against the bent band to force it against and fasten it to the inner faces of the neck.

6. In a neck making machine the combination of a former, means to turn the said former, means to lock the former in operative position after each revolution thereof, means to locate a strip of material against one of the sides of said former while it is at rest, a buffer in the machine opposite the strip of material, means to move the buffer so as to fasten or glue a band against said strip, a roller pressing the band against said strip during the turning of said former, means to sever the band before the said former has completed a revolution and means to bend and fasten the outer portion of said band to the inner surface of said strip.

7. In a neck making machine the combination of a pair of wheels for a reel of paper and the like, a glue box adjacent to said reel, a glue wheel in the box, rollers leading the band of paper from the reel over the glue wheel, a driving shaft journaled in the machine, a cam on said shaft, an arm pivoted in the machine, a roller journaled in the arm in the path of said cam, a link with one end pinned to said arm, a bracket supported in the machine, an arm pivoted to the bracket, a second arm pivoted to said bracket, a pin on the latter arm in the path of the first arm, a roller journaled to the link engaging said band, the roller pulling the band from the reel by virtue of the rotations of the driving shaft and the intervening elements.

8. In a neck making machine the combination of a driving shaft, means to rotate the shaft, a cam drum having groove cams secured to the driving shaft, three pairs of arms pivoted on opposite sides of the cam drum, a roller pivoted to one of the arms of each of said pairs engaging its accompanying groove cam, a sleeve journaled in the machine, means to intermittently rotate said sleeve, a tubular sleeve slidably connected to said sleeve, a connection between the tubular sleeve and an arm of one of said pairs, an intermediate sleeve slidably located within the tubular sleeve, a connection between the intermediate sleeve and an arm of the said second pair of arms, a third sleeve slidably located within the intermediate sleeve, a connection between the third sleeve and one of the arms of the third pair of arms, a rod slidably supported in the third sleeve, a spur gear on the drum shaft, a cam on the gear, a lever pivoted on the machine, a roller in one end of said lever and in the path of the latter cam, a connection between the other end of said lever and said rod, an outer guide box connected to one end of the tubular sleeve, a second and inner guide box within the outer guide box and connected to the intermediate sleeve, a former within the inner guide box and secured to the third sleeve and a finishing plunger carried on the said rod.

9. In a neck making machine the combination of a rectangular outer guide box having recesses, means to rotate said box, means to reciprocate said box, an inner guide box slidably located within the outer guide box, fingers extending from the inner box in the path of said recesses, means to reciprocate the inner guide box, a former for a band of paper slidably located within the inner box, means to reciprocate said former and a catch pivoted to said former to pinch a strip of material thereto.

10. In a neck making machine the combination of an outer guide box, means to rotate said box, means to reciprocate said box, an inner guide box slidably located within the outer guide box, means to reciprocate the second box, a former for a strip of material slidably located within the second guide box, a finishing plunger axially in line with the said former, slotted ends on the plunger and means to adjustably spread said slotted ends.

11. In a neck making machine the combination of a former for a strip of material, means to fasten a band on said strip, means to rotate the said former, means to reciprocate said former, a closer in the path of said band and having guide slots, cross heads in said slots and having closer bars formed therewith, means to reciprocate said cross heads to force said closer bars against said band.

12. In a neck making machine the combination of a former to form a neck or frame thereon, means to glue a paper band on the outer surface of the neck, a closer co-acting with the former with its axis in the axial line of said former, closer bars slidably located in the closer in the path of the said paper band to bear thereon and bend it over the edge of the frame or neck, a driving shaft in the machine, a cam on said shaft, a lever pivoted in the machine, a roller journaled on said lever in the path of the said cam, a link pinned to the lever, a ring carrier in the closer connected to said link and all the closer bars connected up with the ring carrier.

13. In a neck making machine the combination of a cam shaft, a cam on the shaft, a lever pivoted in the machine, a roller journaled on the lever in the path of said cam, a link with one end pivoted to the lever, a ring carrier of a closer pinned to the other end of the link and caused to move by the link, pins extending from the ring carrier, an annular plate connected to the machine to support the ring carrier, cross heads having slots slidably supported in the annular plate, the said slots engaging said pins, closer bars extending from the cross heads which reciprocate when the ring carrier is caused to move and return to its original position.

Signed at the borough of Manhattan in the county of New York and State of New York this 25th day of November A. D. 1911.

BERNARD ROUS.

Witnesses:
A. A. DE BONNEVILLE,
CHESTER E. MANN.

Copies of this patent may be obtained for five cents each, by addressing the "Commissioner of Patents, Washington, D. C."